(12) United States Patent
Reineke et al.

(10) Patent No.: US 11,797,702 B2
(45) Date of Patent: Oct. 24, 2023

(54) ACCESS CONTROL RIGHTS ASSIGNMENT CAPABILITIES UTILIZING A NEW CONTEXT-BASED HIERARCHY OF DATA BASED ON NEW FORMS OF METADATA

(71) Applicant: EMC IP Holding Company LLC, Hopkinton, MA (US)

(72) Inventors: Nicole Reineke, Northborough, MA (US); Hanna Yehuda, Newton, MA (US); Omar Abdul Aal, Cairo (EG); Farida Shafik, Cairo (EG); Joel Christner, San Jose, CA (US); Shary Beshara, Cairo (EG); Ahmad Refaat Abdel Fadeel Ahmad El Rouby, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 421 days.

(21) Appl. No.: 17/198,734

(22) Filed: Mar. 11, 2021

(65) Prior Publication Data

US 2022/0292211 A1 Sep. 15, 2022

(51) Int. Cl.
*G06F 21/62* (2013.01)
*G06F 16/23* (2019.01)

(52) U.S. Cl.
CPC ...... *G06F 21/6218* (2013.01); *G06F 16/2379* (2019.01)

(58) Field of Classification Search
CPC ............ G06F 21/6218; G06F 16/2379; G06F 16/2228; G06F 16/252
See application file for complete search history.

(56) References Cited

U.S. PATENT DOCUMENTS

| 9,038,168 | B2* | 5/2015 | Ben-Zvi | G06F 21/6218 |
| | | | | 713/182 |
| 2016/0292445 | A1* | 10/2016 | Lindemann | G06F 16/353 |
| 2019/0268379 | A1* | 8/2019 | Narayanaswamy | |
| | | | | H04L 63/0245 |
| 2021/0073179 | A1* | 3/2021 | Berman | G06F 16/122 |
| 2021/0303714 | A1* | 9/2021 | Yaghoobi | G06N 20/00 |
| 2022/0012241 | A1* | 1/2022 | Colcord | G06F 9/541 |
| 2022/0103566 | A1* | 3/2022 | Faulkner | H04L 67/06 |
| 2023/0004663 | A1* | 1/2023 | Shafik | G06F 21/62 |

\* cited by examiner

*Primary Examiner* — Han Yang
(74) *Attorney, Agent, or Firm* — Workman Nydegger (57) ABSTRACT

One example method includes extracting content metadata from data, storing the content metadata in a data catalogue, receiving at the data catalogue, from a user, a request to access the data, transmitting, by the data catalogue to a security service provider, an access request that includes the extracted content metadata and metadata relating to the access request, accessing, by the security service provider, identity metadata concerning an identity of the user, and a data access policy, and transmitting, by the security service provider to the data catalogue, a decision as to whether or not access can be granted to the data, and the decision is based on the data access policy, the identity metadata, and the metadata in the access request.

20 Claims, 6 Drawing Sheets

DATA Dictionary

| Table Name | Attributes Name | Contents | Type | Format | Range | Required | PK or FK | FK reference table |
|---|---|---|---|---|---|---|---|---|
| Customer account | Cu No | Customer number | Int | 9999 | 00001-99999 | Y | PK | |
| | Username | Customer's username | Varchar | xxxxxx | | Y | | |
| | Password | Customer's password | Varchar | xxxxxx | | Y | | |
| | FirstName | Customer first name | Varchar | xxxxxx | | Y | | |
| | LastName | Customer last name | Varchar | xxxxxx | | Y | | |
| | e-mail | Customer's e-mail | Varchar | xxx@vxx.com | | Y | | |
| | Tel | Customer's telephone number | Int | 99-09999-999 | | N | | |
| | DOB | Date of birth | Date | xx-xx-xx | | N | | |
| Restaurant Tables | TableNum | Table Number in restaurant | Int | 9999 | 00001-99999 | Y | PK | |
| | Status | Table's status | Char | Y or N | | Y | | |
| | Cu No | Customer number | Int | 9999 | | N | FK | |
| Menus Record | MenuID | Menu's id | Int | 9999 | 00001-99999 | Y | PK | |
| | Name | Menu's name | Varchar | xxxxxx | | Y | | |
| | Img | Menu's image | Varchar | c:/xxx/xxx/xxx | | Y | | |
| | Des | Menu's description | Varchar | xxxxxxxxxxxx | | Y | | |
| | Ingredients | Ingredients of the menu | Varchar | xxxxxxxxxxxx | | Y | | |
| | Promotion | The promotion | Varchar | xxxxxxxxxxxx | | Y | | |
| Order Record | OrderID | Order's id | Int | 9999 | 00001-99999 | Y | PK | |
| | Order | Orders from customer | Varchar | xxxxxxxxxx | | Y | | |
| | TableNum | Table number that ordered | Int | 9999 | | Y | FK | TableNum |
| | Order time | Ordering time | DateTime | 99:99:99 | | Y | | |

```
package opa.authorization

# Users of classification level 4 & higher can read pii data of their region
All users can access non-sensitive data default allow = false allow {
    action_is_read
    same_location
    input.user.classificationLevel > 3
} allow {
    data_not_sensitive
} same_location {
    input.user.location == input.entity.location
} action_is_read {
    input.actionType == "ENTITY_READ"
} data_not_sensitive {
    not data_pii
} data_pii {
    "pii" == input.entity.attributes.discovered_flags[_]
}
```

ACCESS CONTROL RIGHTS ASSIGNMENT CAPABILITIES UTILIZING A NEW CONTEXT-BASED HIERARCHY OF DATA BASED ON NEW FORMS OF METADATA

FIELD OF THE INVENTION

Embodiments of the present invention generally relate to data access control. More particularly, at least some embodiments of the invention relate to systems, hardware, software, computer-readable media, and methods for assignment of data access rights using a context-based hierarchy that may be constructed using various forms of metadata.

BACKGROUND

Assignment of access control rights to data is used to provide some assurance that only authorized entities will have access to certain data. This assignment may be performed by IT administrators and Chief Security Officers. Conventional approaches to access control often involve one or both of Attribute-Based Access Control (ABAC), and Role-Based Access Control (RBAC). An example of RBAC can expressed in the form: "user X is a member of group Y, and group Y has permission to resource Z." In this example, the role of user X is the basis for the membership of user X in group Y, and because user X is a member of group Y, user X is permitted access to resource Z. On the other hand, an example of ABAC can be expressed in the form: "user A is a member of some group that holds attribute B and is accessing content C that also holds attribute B." In this example, the access permitted to user A is based on the fact that the content C has an attribute B held by a group that user A is a member of.

Although ABAC and RBAC are commonly used, they have proven problematic, due at least in part to their lack of flexibility in modern computing environments. The examples discussed below are illustrative.

Some problems with conventional approaches to data access concern data location, and inconsistencies. Data exists everywhere, and everywhere that data resides, a repository of some kind is holding that data. In a multi-cloud world for example, several different kinds of repositories exist each with their own context about what constitutes a "user," and what permissions those users have to access the data that the repositories contain. Some examples of such cloud environments and configurations include Isilon in a data center with Active Directory, Amazon S3 with AWS IAM, and Google Cloud Storage with GCP IAM.

Data dictionaries serve to define the schema and syntax of data. Data catalogs serve to create a library of where data exists. The underlying repositories, however, each have their own unique representation of who has access to what information. Thus, enterprises are enjoying the benefits provided by data catalogs: a view over all of their data assets, and, a centralized way of controlling access to the data. However, movement of data from one repository, Isilon for example, to another repository, such as Amazon S3 for example, creates a change in how rights to access the data are defined and enforced. Further, data that is shifted from one location to another where a capability gap exists within the definition or enforcement of access rights could put the business at risk.

Another problem with conventional approaches to data access is that data access management can impose a significant burden on systems and personnel. Data catalogs expose information through queries and access requests, providing data owners and data managers the right to explicitly approve or deny requests to a given data set. As more organizations move to a model leveraging data catalogs, data owners and data managers will naturally become a bottleneck to data access, as they will need to service ever more data access requests. Such circumstances may put the organization at risk because a data owner or data manager could approve a data request for a given user by on accident, maliciously with the knowledge that they should not have access, or without knowledge of some regulation or policy that may be incident to the data in question.

Data content changes also present problems with the use of conventional access control approaches. Data continually changes, and as such, measures to control access rights to the data must change with it. It only takes a moment for a data breach or access to sensitive data to occur resulting in a compliance violation or a billion dollar lawsuit, as illustrated by the Equifax data breach that took place in 2017. When new data emerges, organizations cannot afford to have that data exposed or otherwise be accessible to an inappropriate requestor.

Still another problem with conventional approaches to data access concerns dataset membership changes. The data sets exposed through a catalog are not static. Files referenced by a data set change over time. Output from a RESTful web service, listed as an asset within a data set, may change with each request. Further, data assets such as files, output from web services, and others, can be moved into or out of a data set on a whim. Data may also be a member of more than one data set.

As another example, conventional data access control approaches are not well suited to address or implement temporal access permissions. However, time-bound access to data sets is becoming increasingly important. For example, it may be necessary to allow someone access to a piece of restricted information only for a limited amount of time, or for a limited time period. Further, the job requirements of an employee may change, the geographic location where the employee works may change, or clearance levels assigned to that employee may change.

As a final example of problems presented by conventional approaches to data access control concerns data movement and copying. For example, data requested through a catalog may be copied elsewhere. This presents a problem when accessing information through a medium that is appropriately secured, and then storing that information in another repository that does not employ the same access policies.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data access control. More particularly, at least some embodiments of the invention relate to systems, hardware, software, computer-readable media, and methods for assignment of data access rights using a context-based hierarchy that may be constructed using various forms of metadata.

In general, example embodiments of the invention involve an approach to data access control and assignment of data access rights that considers additional, useful pieces of metadata while also simplifying the process of providing data access rights to entities. This approach may be particularly useful in regulated environments such as finance and healthcare for example, as well as in environments that require clearance such as government and military.

Particularly, data may be categorized through generation and/or derivation of metadata concerning that data. The metadata may be coupled with existing access rights assignment mechanisms. Such data discovery capabilities may consider the contents of the data, and may generate or identify attributes, such as noting that a dataset contains credit card information for example, of the data which may be taken into consideration when defining and implementing access rights concerning that data. Such attributes may be defined in a hierarchical manner. To illustrate, a file might be annotated as "sensitive," with a sub-annotation of "product plans," and yet another sub-annotation of "project lightning." Data access rights may be defined based in part on any of the annotations or sub-annotations.

In more detail, a context-based hierarchy that may be used in defining and implementing access rights may consider various types of data and/or metadata. For example, a context-based hierarchy may consider metadata concerning any one or more of information about the person requesting access to the data, information about the data request itself, information about the content being requested, metadata derived from the content itself, and hierarchical relationships between/among the various types of metadata. Using such a context-based hierarchy, access may be assigned using any combination of the aforementioned properties, and/or other properties, and/or at any level of the hierarchy.

In one example embodiment, content metadata may first be extracted from various data sources. The content metadata may include different attributes implicitly or explicitly describing properties of the data itself. A user may then submit a request to access the data and, as a result of the request, a data catalog may append metadata about that request to the content metadata and then send a request to a security service to determine whether or not the user is authorized to access the data to which access was requested by the user. The security service may obtain metadata concerning the user from a source such as an identity server. The security service may then determine, based on the identity information of the user, the request metadata, and the content metadata, whether or not to grant the user access to the data. The decision of the security service may be communicated to the catalog. Because definition of the policy, and the policy-based decision concerning access, are made separately from the data itself, embodiments of the invention thus enable the creation and use of domain-agnostic policies, and may also decouple the policy from the data, allowing enforcement of the access control policy regardless of where the data lives, that is, where the data is stored.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may enable an access policy to be applied to data without regard to where the data is stored or physically located. An embodiment of the invention may enable a flexible approach to data classification and, thus, to implementation of access policies that take into consideration changes to the data and/or changes to the organization in which the data is accessed. An embodiment of the invention may apply access policies to new or modified data immediately, that is, as soon the data is added to a system in which the policies are in effect. An embodiment of the invention may provide for the definition and implementation of highly granular data access polices. An embodiment of the invention may detect and identify exception conditions that may then be brought to the attention of an administrator. An embodiment of the invention may automatically scan data and revise existing access policies based on data changes detected. An embodiment of the invention may implement access policies that impose temporal limits on data access. An embodiment of the invention may provide a basis for a future response, such as in the form of the development and implementation of new/modified data access policies, to as-yet unimplemented data access statutes and regulations.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which access policies are defined, implemented, and modified, on an ongoing basis, for large numbers, such as hundreds, thousands, millions, or more, files billions for example, of datasets. Such access policies may be defined and implemented for an ever-changing body of users that may number in the hundreds, thousands, or more. Such definition, modification, and application, of data access policies, is well beyond the mental capabilities of any human to perform practically, or otherwise. Thus, while certain, simplistic, examples are disclosed herein, those are only for the purpose of illustration and to simplify the discussion, but do not represent real world applications of embodiments of the invention. Accordingly, nothing herein should be construed as teaching or suggesting that any aspect of any embodiment of the invention could or would be performed, practically or otherwise, in the mind of a human.

A. Overview

In general, example embodiments embrace, among other things, the definition and application of data access policies. In this regard, it is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Historically, providing access rights to data might map a given data asset, such as a file, folder, share, or bucket, for example, to an entity such as a user, group, or organizational unit. Because such attributes and users are, in these example, defined at a relatively high level, they may be considered as coarse attributes. In contrast, embodiments of the invention embrace, and/or are usable in connection with, data discovery capabilities that may operate to categorize data by, at least in part, generating and/or deriving useful metadata about data. The creation/derivation and use of such metadata, which may or may not be coupled with existing access rights assignment mechanisms, may shift the way in which entities are allowed access to information. These data discovery capabilities may consider, among other things, the content of data and generate attributes of the data, such as the fact that a dataset includes credit card information for example, which may be considered as an attribute when defining and implementing access rights.

Further, and as noted earlier herein, these attributes may be defined in a hierarchical manner. As well, mechanisms for data management and discovery, in accordance with embodiments of the invention, may provide a dramatically improved set of metadata regarding the data of an organization.

For example, an embodiment of the invention may, for each piece of data, provide for generation of metadata based on attributes such as file type, access mechanism, ownership, and detailed analysis of the data content. This metadata may include attributes specifying the content category. To illustrate, a document X may contain PCI (Payment Card Industry) information such as a credit card number for example, and may also contain PII (Personal Identifiable Information). Metadata may be generated through a combination of normalization, semantic processing, natural language processing, an AI/ML (Artificial Intelligence/Machine Learning), and/or, or manual rules. As well, embodiments may provide that metadata created about content is exposed through data catalogs. The structure of this metadata may be defined and managed in data dictionaries.

All of these elements may combine, and participate in, what may be referred to as a metadata control plane.

Thus, embodiments of the invention may take into consideration elements such as, but not limited to: existing mechanisms for assigning access rights; data content; metadata about the data; and, interfaces through which metadata is exposed and managed, that is, a metadata control plane. Some, or all, of such elements may be used as the basis for creation of a context-based hierarchy for assigning both explicit and implicit access rights to data.

With regard to existing mechanisms for assigning access rights, RBAC is generally proven and has been widely-adopted. However, this is not the case with ABAC, which presently has no reference or standard that is accepted as being de facto. Although widely adopted, RBAC has proven itself too limiting and difficult to manage, and inflexible when it comes to managing access rights to specific types of information contained within a resource in which the user is authorized to access. For instance, user X has access rights to file share Y, but should not have rights to file Z in file share Y because file Z contains credit card numbers. However, the low level of granularity of RBAC may not prevent user X from accessing the credit card numbers.

Further, ABAC has not reached mass adoption due to the lack of a de facto standard, which has led vendors to providing their own solution-specific implementations. While arguably effective in the narrow vendor-specific context, this approach leads to complexity and cost for IT staff in defining, implementing, and managing access control policies. Further, ABAC implementations lack valuable contextual dimensions when defining policies for determining to which pieces of data a user has rights.

B. Data Dictionaries and Data Catalogs

Figure 1:
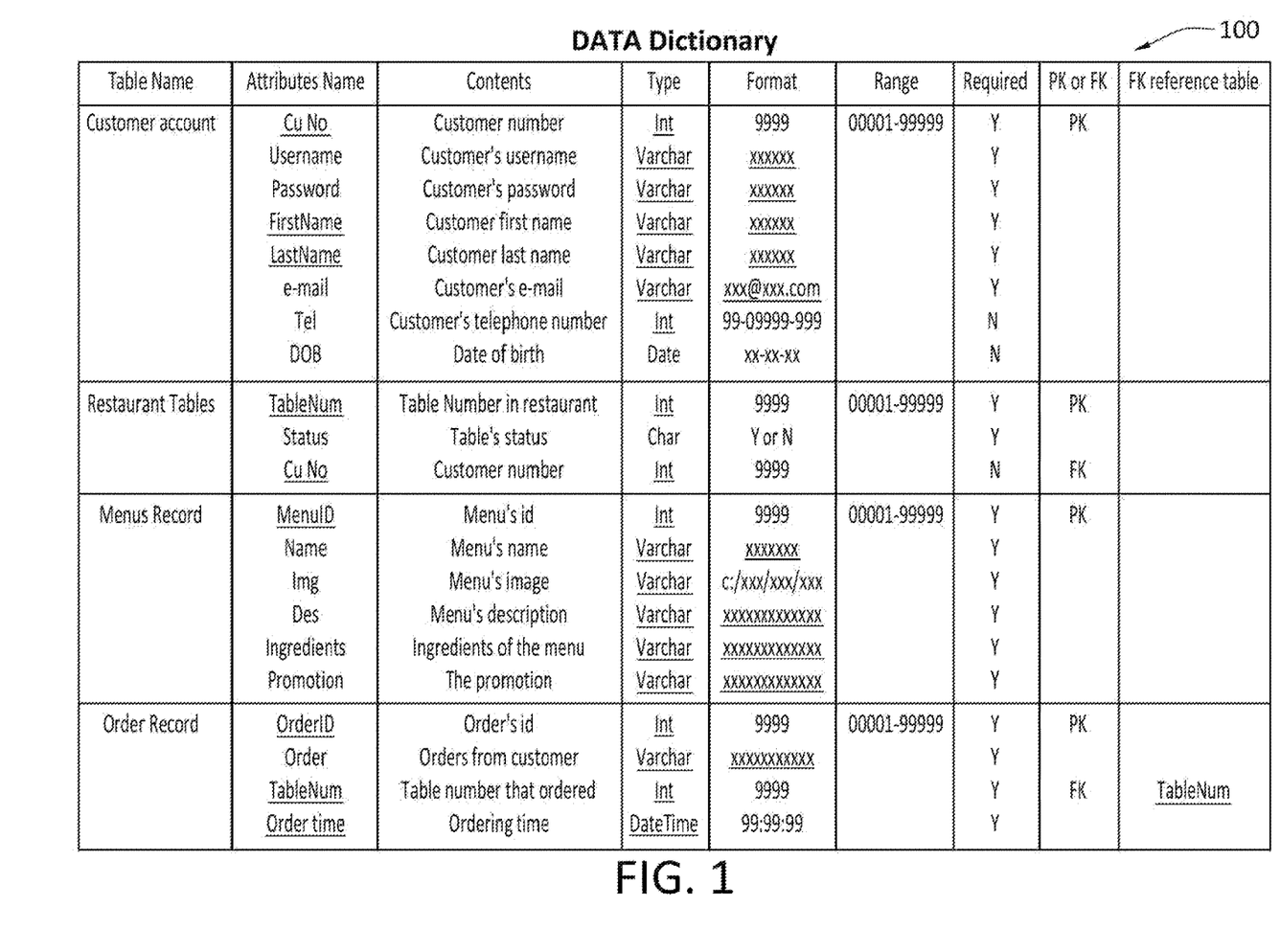
FIG. 1 discloses aspects of an example data dictionary.

Following is a general discussion of data dictionaries and data catalogs, in connection with which some embodiments of the invention may be employed. In general, a data dictionary may loosely be equated to a database schema in that a data dictionary may provide a formal definition for the structure, syntax, and relationships amongst elements contained within a data resource such as, for example, a database, or a JSON (JavaScript Object Notation) object. Data dictionaries may contain, for example, field names, the expected type of value, ranges that are considered valid, or the ability of the value to be null, and linkage to other pieces of data within the data resource. For example, and with reference to the example data dictionary 100 in FIG. 1, the 'Customer account' table has eight attributes, or properties, one of which is the 'Cu_No' (customer number) property. The 'Cu_No' property is also a property of the 'Restaurant Tables' table. While data dictionaries are widely used, they are not effective as mechanisms for access control, as they would require explicit management of potentially millions of entries. Even a data dictionary as simple as the data dictionary 100, which includes only four table entries, may be relatively complex to manage.

Data catalogs, sometimes referred to as 'data libraries,' are repositories that expose interfaces by which data metadata can be accessed. Data catalogs may expose metadata through RESTful APIs, message queues, or connectors to other applications. Unlike traditional repositories, such as file servers or NAS (Network Addressed Storage), where a user can see a view of files, data catalogs contain metadata, that is, information about data that is stored elsewhere. This metadata can be for files on file servers, data stored in a database, objects in cloud storage, data returned from web services, or other types of data.

Metadata exposed through the catalog may be added thoughtfully and intentionally by a data administrator, or, programmatically added to the catalog by another application. This is in stark contrast to the case of a file server where a user may treat the file server as general-purpose storage. With a data catalog, users and applications may be able to search through metadata to find data that suits their needs. Again, unlike a file server, data catalogs do not typically store data, but store metadata about the data, as well as references to where the source data, that is, the data with which the metadata is associated, resides. As well, data catalogs may restrict access to information, and even restrict access to the understanding that information exists, also known as view masking. Such implementations may be based on RBAC or ABAC.

Figure 2:
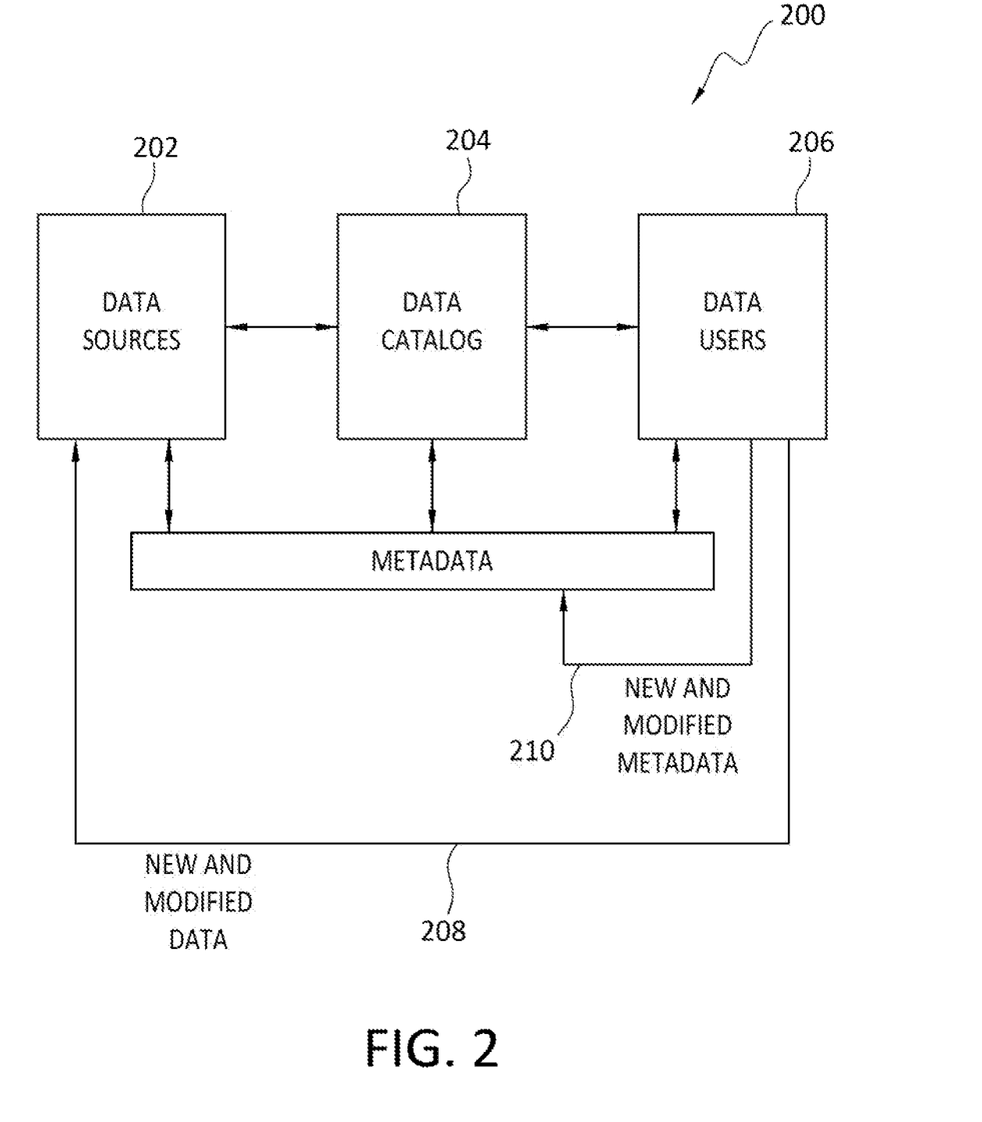
FIG. 2 discloses aspects of an example data catalog reference model.

With reference briefly now to FIG. 2, some aspects of an example data catalog reference model (DCRM) 200 are disclosed. As indicated, the DCRM 200 may comprise, or be associated with, one or more data sources 202 which may include data sources internal to an enterprise and/or data sources external to an enterprise. A data catalog 204 may contain metadata concerning data stored in the data sources 202. Users 206 may search the metadata in the data catalog 204 to identify particular data of interest. As shown, user 206 activity may result in the generation of new/modified data 208 and/or new/modified metadata 210.

C. Further Aspects of Some Example Embodiments

In general, embodiments may implement a context-based hierarchy to generate a hierarchical representation against which access rights may be assigned. Such a context-based hierarchy may include, use, and/or implement, various elements. One such element is information, including metadata, about the requestor, that is, the person requesting access to data. Such information may include, for example, a user name, organizational unit, group membership, and/or other metadata relating to the requestor. To illustrate, user "joe" may be contained within organization "Acme Inc," as well as within organizational unit "Engineering," and user "joe" may also be a member of several groups including "development" and "security." In this illustrative example, two tags are applied to user "joe," namely, the tags "superuser" and "secops." This information may be readily available.

Another element that may be included in a context-based hierarchy according to one or more embodiments is information, including metadata, about the request itself. Such metadata may include, for example, the identity of the person who made the request, a physical location and/or computing system where the request was made from, to whom the request was made, and the type of request. This information may be already readily available.

A context-based hierarchy according to some example embodiments may include an element such as information, including metadata, about the dataset being requested. Note that a dataset could, for example, be a single block of data, a file, or a group including any number of files. Such metadata may include, for example, file name, length, date of creation/modification, repository where stored, and ownership information. This information may be readily available.

Still another element that may be included in a context-based hierarchy according to some embodiments is information, including metadata, which may be derived, or derivable, from what is contained within the content itself, including tags indicating sensitive information, data categorization, or other properties. This information is available when software external to the catalog generates it prior to updating the catalog. The derivation and/or extraction of such metadata may be performed using various methods including, but not limited to, NLP (Natural Language Processing), AI/ML, and semantic analysis.

A final example of an element that may be included in a context-based hierarchy is hierarchical information implicit or explicit in the metadata itself. For example, metadata may be nested within other metadata. To illustrate, "sensitive." as a derived metadata attribute, may contain or imply a sub-attribute of "product plans," which in turn may contain or imply a sub-attribute "project lightning."

With a context-based hierarchy including one or more elements such as the examples noted above, access rights may be assigned to content using any combination of the aforementioned properties or elements, and at any level of the hierarchy. For example, a policy could be defined against any requestor with the tag "secops" accessing a resource tagged "project lightning" or categorized as "sensitive."

A data access control mechanism leveraging the context-based hierarchy may provide various functionalities when implemented in, or in other association with, a data catalog. One such functionality is the ability to enforce a data access policy regardless of the physical location of that data. Another such functionality is the ability to enforce policy regardless of who or what generated the data, how the data was generated, or when the data was generated. When the catalog participates as part of a larger system with software that analyzes data and then writes the data metadata and derived metadata into the catalog, the access control mechanism according to example embodiments may yield an additional useful function, namely, the ability to automatically apply policy to data without manual intervention by a human user.

D. Example Methods

It is noted with respect to the example method of Figure that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Figure 3:
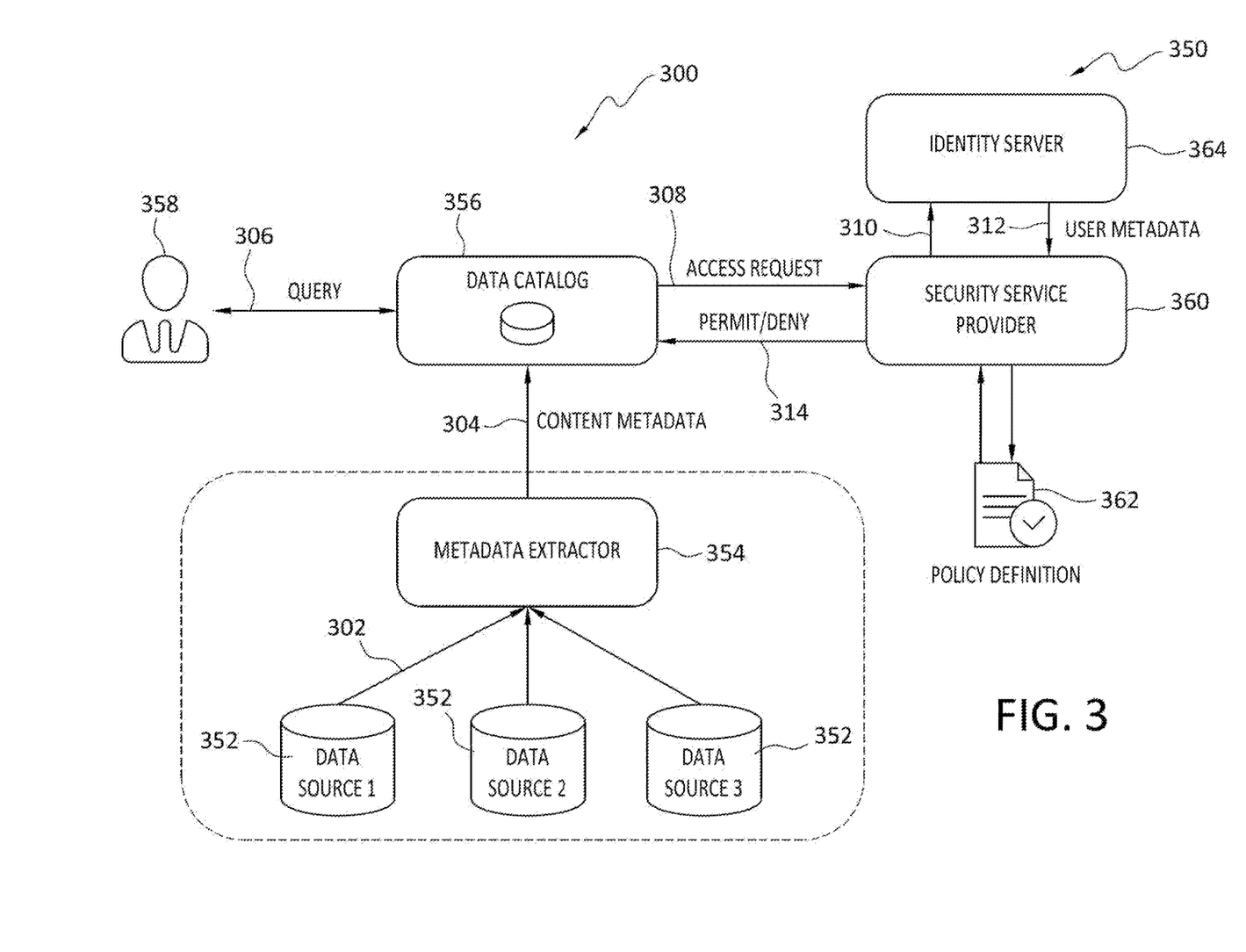
FIG. 3 discloses aspects of an example architecture and associated method.

Directing attention now to FIG. 3, methods are disclosed for assigning access control rights using a context-based hierarchy, where one example method is denoted generally at 300. The example method 300 may be implemented in connection with various architectures and systems, one example of which is denoted at 350.

The example system 350 may include a data store with one or more data sources 352. Any type, amount, or combination, of data may be stored in the data sources 352. The data sources 352 may comprise databases or other data storage structures, and may employ any type of storage devices, examples of which are disclosed herein.

A metadata extractor 354 may be provided that is able to communicate with the data sources 352. As disclosed elsewhere herein, the metadata extractor 354 may operate to extract and/or derive metadata from the data stored in the data sources 352. The metadata, however obtained, may be referenced or stored in a data catalog 356. Metadata referenced or stored in the data catalog 356 may be searched by a user 358 to identify particular data of interest to the user.

The data catalog 356 may communicate with a security service provider 360 to implement access controls with respect to the data stored in the data sources 352. As part of this implementation, the security service provider 360 may comprise, or have access to, a library 362 that may contain one or more policy definitions.

Finally, the security service provider 360 may also communicate with an identity server 364. Among other things, the identity server 364 may hold, and provide, metadata concerning users that may request access to data.

With continued reference to FIG. 3, the method 300 may begin when content metadata is extracted 302 from different data sources 302, possibly across multiple repositories, and stored locally or sent 304 to the data catalog 356 which may act as a single source of truth. The content metadata may include different attributes describing properties of the entity, such as a file for example, that comprises, or consists of, the data of interest. Such entity attributes may be, for example, a file name, length, file owner, and file creator. The content metadata may also comprise derived metadata that has been extracted from the data such as, for example, sensitivity level of the data, specific data content, data category, and/or others. As noted herein, such metadata derivation and/or extraction may be performed in various ways.

At some point after the metadata has been sent 304 to the data catalog 356, the user, or requestor, may send 306 an access request, or query, to perform various actions such as view, edit, or search for the data referred to by the metadata in the data catalog 356. The data catalog 356 may then append the metadata about the request and/or the requestor, such as source IP address, user, and action type, for example, to the content metadata identified in or implied by the access request 306. The data catalog 356 may then generate a request that includes both the content metadata and the request/requestor metadata, and sends 308 that request to the security service provider 360 to determine whether the user is authorized to perform the requested action(s) on the data set specified in the request 306.

In some embodiments, the identity server 364, which may comprise an LDAP (Lightweight Directory Access Protocol) server for example, can be used to store user information along with any other metadata attributes or tags. For example, properties of a user may include his/her workgroup(s), title, and confidentiality or security clearance level. This information may be queried 310 by the security service provider 360, and may be handled and stored independent from the data catalog 356.

The security service provider 360, which may act as the policy decision point, and gatekeeper to the data, may determine, based in part on one or more policies and the user metadata received 312 from the identity server 364, the result of the access request 306 based on the policy defined, and forward 314 the result, or decision as to whether or not access is permitted, to the data catalog 356.

Having the data access policy defined, and the access decision made, separately from the data, enables the definition and use of domain-agnostic policies. As well, this approach may decouple the policy from the data to which the policy applies, so as to allowing enforcement of the access control policy regardless of where the data lives.

E. Further Discussion

It will be appreciated that embodiments may implement, and/or enable the implementation of, various useful functionalities. Any embodiment may, or may not, employ any one or more of the disclosed functionalities, in any combination. One such functionality concerns the transcendence of data location. That is, by employing a context-based hierarchy in a data catalog, access control policies may be applied globally, and without regard to the physical location of the underlying data.

Another such functionality concerns simplified access control management. In particular, by employing a context-based hierarchy in a data catalog, embodiments of the invention may enable businesses to benefit through simplified management of access control. Rather than following legacy RBAC and ABAC models that are inflexible or cannot adapt to changes in the organization or data, use of a context-based hierarchy may allow definition of policy based on the actual classification of data (metadata), the attributes associated with the request and the requestor, and other parameters as disclosed herein. Moreover, while the components of embodiments of the context-based hierarchy may include the components that are core to both RBAC and ABAC, and while many of those RBAC and ABAC components could be used in a policy defined using a context-based hierarchy, the RBAC and ABAC components need not be not central to any embodiments of the invention, at least because the components used in the context-based hierarchy according to such embodiments may be derived and conceptual in nature. For example, and in contrast with an RBAC/ABAC approach, an embodiment of the invention may not allow users without the "finance" tag to access "revenue reports."

Another functionality that may be implemented by some embodiments relates to reduced time-to-security. Particularly, by leveraging a context-based hierarchy in conjunction with intelligent ingestion, that is, analysis of content to create derived metadata, the gap that exists between the time when content, or data, is added to when a policy is applied to that data may become zero, as the content attributes themselves would dictate the access policy that is applied to the data. The approach employed by some embodiments may also enable the proactive notification on failed access attempts by people of a certain "level" or "group" that are not authorized to access the data, at least for the purposes that the user has requested. For example, a user with "read only" access may not be authorized to perform any "write" operations on any data that the user is authorized to read.

Still another functionality that may be implemented by one or more embodiments concerns access control accuracy. For example, by leveraging a context-based hierarchy in accordance with some example embodiments, businesses may enjoy relatively better accuracy when employing access control. Rather than defining and using coarse policies, for example, permit group "engineering" to access share "engineering_files," more granular and refined policies could be defined, for example, that would permit users in group "engineering" to access documents annotated with the tag "engineering_files." In this latter case employing a more granular data access policy may have various useful implications. For example, engineering users could access "engineering_files" wherever the users and/or files are located. As another example, should someone mistakenly put finance-related files in the "engineering_files" share, engineers would not have access to the files because the files were not tagged with the tag "engineering_files."

Embodiments of the invention may also implement functionality relating to identification of outlier data that is either not protected, or not adequately protected, with data access controls. By leveraging a context-based hierarchy, embodiments of the invention may implement exception conditions that may generate alerts should data be detected that is not covered under a defined data access policy. This may allow administrators to be alerted to data that is not covered and allow the administrators to amend their policies to ensure their security controls are appropriate for the data concerning which the alert was generated. This approach may also allow visibility into types of data that may not be appropriate for the organization. The organization may look at the data to determine why no access controls were in place for that data and/or the organization may determine that the data does not require access controls, such as in the case of public data for example.

Embodiments of the invention may also implement the ability to automatically make changes to data access policies in response to changes in the data covered by those policies. For example, by leveraging a context-based hierarchy, embodiments of the invention may enable businesses to benefit from data access policies that would adapt as content changes, and/or in response to changes in one or more variables or attributes relating to a data access request. In more detail, data may be periodically analyzed, and if changes to the data are identified during the analysis, new metadata may be generated, and the data catalog updated to include the new metadata, and the new metadata may also be used as a basis to amend the policies relating to the new data. When a request for data arrives and the context hierarchy is evaluated, the data catalog may detect that the metadata is outdated compared to the origin data, and the data catalog may trigger an on-demand re-evaluation of the data to update the metadata, which may thus also amend whatever policies may incident, that is, relevant to, the updated data.

Still another function that may be implemented by one or more embodiments concerns time-bound access, and extension requests. For example, by leveraging a context-based hierarchy, embodiments of the invention may enable businesses to apply attributes within the hierarchy that dictate the amount of time for which a requestor would have access to a data set, and/or dictate a particular timeframe during which the data would be accessible to the requestor. Those same attributes may also cause the catalog to notify the user should their access be nearing revocation, or may automatically cause a request to be generated for an extension for data access on behalf of the user.

A final example functionality that may be implemented by one or more embodiments relates to the flexibility of embodiments to be prepared for future implementation of data related guidelines by agencies, countries, and regulatory bodies, for example. By using a context-based hierarchy where metadata attributes are defined for underlying data, embodiments of the invention may enable businesses to better position themselves to handle future regulatory requests. Data access policies may be defined based on existing metadata attributes, and/or new metadata attributes may be defined that inform data ingestion processes and data handling. To illustrate, "ssn" may be an attribute that is detected currently to classify data as sensitive. In the future, regulation may dictate that, in addition to SSN, the full name of a person may be considered or defined as sensitive, in which case the data ingestion mechanisms may be informed to also flag data containing first and last names, and to identify or tag such data as sensitive.

F. Some Example Use Cases

Figure 4:
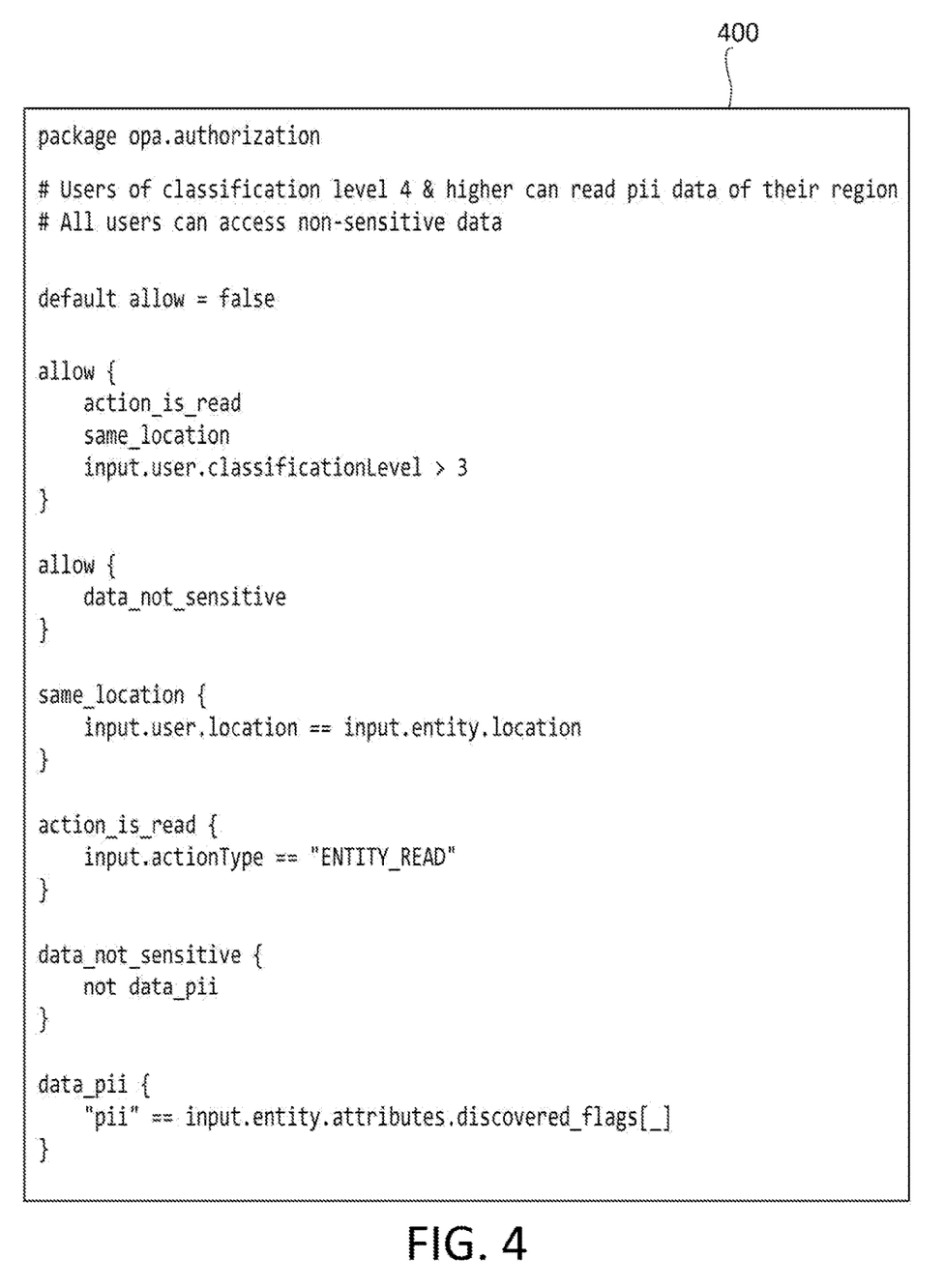
FIG. 4 discloses an example context-based authorization scheme.

One example use case for some embodiments relates to tag based policies. Particularly, access to data may be granted/denied based on the existence or absence of one or more tags in conjunction with other attributes. For example, when a user attempts to access data, the data catalog may send the relevant contextual metadata to the security service provider, which checks for the existence of a tag indicating content sensitivity, such as 'pii' or 'pci' for example, within the content metadata, and determine, using the user identity metadata and other elements of the context-based hierarchy, if the requester has the clearance to access the sensitive data. Similarly, unconditional access may be provided to data that is tagged as 'public.' Ultimately, a final answer may be returned from the security service provider and enforced at the policy enforcement point, allowing or denying the user access to the data. One simple example of this concept is disclosed in the examples of FIGS. 4 and 5. FIG. 4 is directed to a sample context-based authorization 400, while FIG. 5 discloses an example data access authorization process 500.

Figure 5:
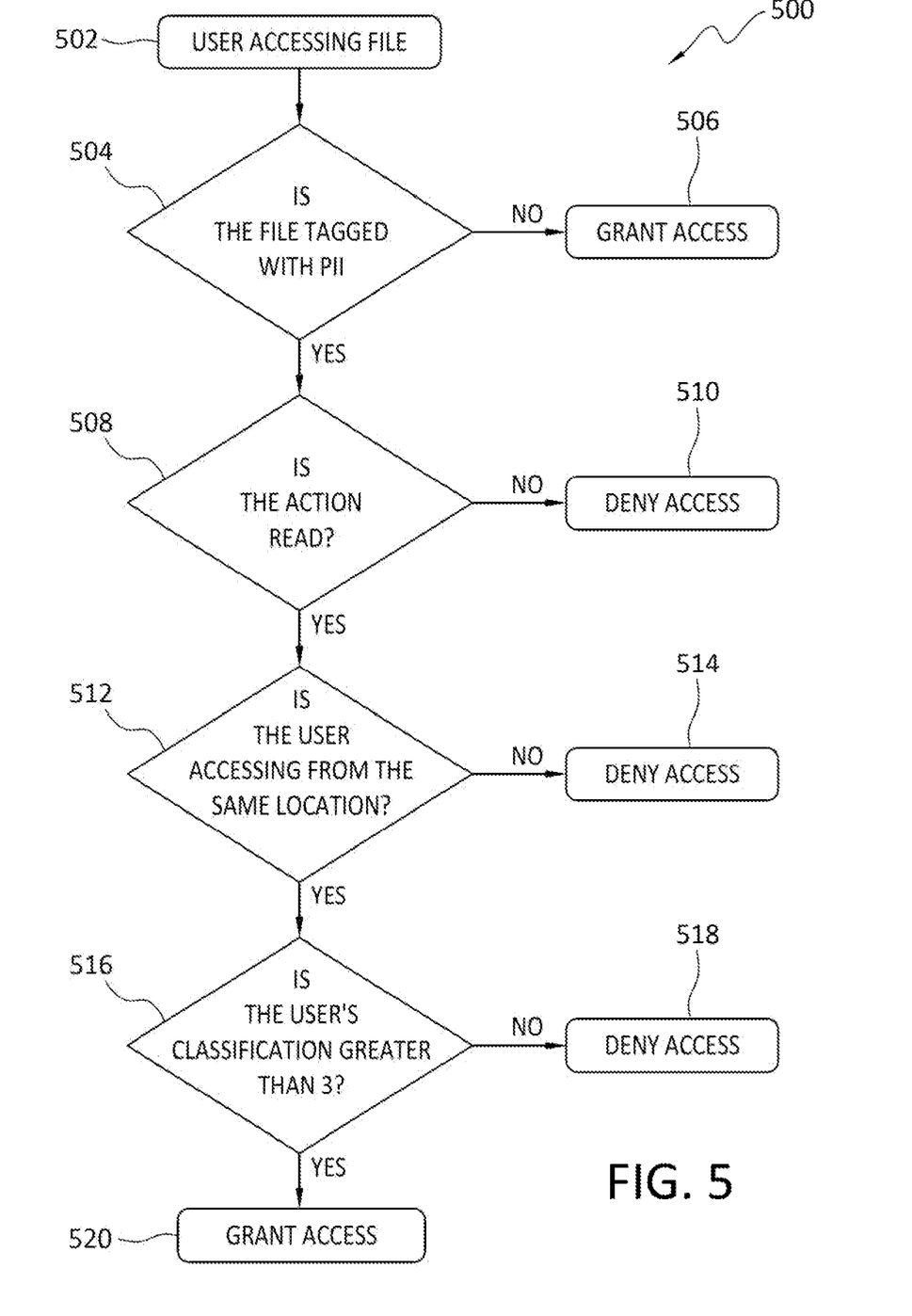
FIG. 5 discloses an example method corresponding to the scheme of FIG. 4.

As shown in the example of FIG. 5, various conditions may have to be met before the user is granted access to data. Initially, the user may request 502 access to data, such as a file for example. A first check 504 may be performed and if the requested fil is not tagged with PII, access to the file may be granted 506. On the other hand, if the file is tagged with PII, then method 500 may advance to 508 where another check is performed, in this case, to determine if the requested access is 'read' access. If the requested access is not simply 'read' access, access may be denied 510. One other hand, if the requested access is only 'read' access, another check 512 may be performed to determine whether the requestor is requesting access from the same location where the data is located. If not, as might be the case where the requestor is a bad actor attempting to gain access from a remote site, access may be denied 514. If, on the other hand, the requestor is at the same site as the data to which access has been requested, a further check 516 may be performed to determine if the user has a classification sufficiently high, having a value greater than '3' in this example, to merit access to the data. If the user classification is not greater than '3,' access to the data may be denied 518. If the user classification is greater than '3,' then access may be granted 520 to the requested data. As illustrated in this example, various conditions may each have to be met before the user is granted access, and the failure to meet any one of the conditions may result in a denial of access.

Another example use case concerns time based policies. In particular, temporary access to data may be granted or revoked by adding an attribute to a policy which only allows access to covered data for amount of time, or within a defined timeframe. Similar to the example flow in FIG. 5, in addition to checking all of the elements of the context-based hierarchy, the security service provider may check the time of the access request that is sent within the request metadata, compare that time against the time constraint defined in the policy, and confidently determine whether access is allowed or not. The decision to grant access, or not, may then be returned to the policy enforcement point to enforce the policy.

A further use case for some embodiments relates to arbitrary metadata attribute based policies. In such a case, a user may be allowed or denied access to data based on the value of one or more metadata attributes. For example, a policy may be written that grants access to a data set if the metadata attribute "foo" has a value="bar." The "foo" attribute may be passed to the security service provider within the contextual hierarchy, allowing the security service provider to evaluate the policy against the key-value pairs, such as (foo, bar), sent within the metadata to determine if the requirements of the policy are met or not, in a flow that may be similar to what is disclosed in FIGS. 4 and 5.

In another example use case, relating to nested metadata attribute based policies, a user may be allowed or denied access to data based on the value of one or more nested metadata attribute. For example, within a hospital environment, data could be of type "confidential" with subtypes "medical" or "financial." Only doctors with a certain clearance level can see confidential of type medical data, while only hospital administration executives can see confidential of type financial data. A policy might thus be written that says if a doctor that has a high clearance level and the data is tagged with a type "confidential.medical," the doctor can read the data. This would only allow such doctors to see "confidential.medical" data, and not "confidential.financial" data.

A further use case relates to the granting of access to similar files, or other similar data, based on content metadata. Particularly, by comparing contextual and natural language processing, a policy may be written to intelligently provide access data to similar documents. Such an approach may also help overcome errors made. For example, suppose Doctor A has access to all "neurological" patient information, but Patient Record B was incorrectly mislabeled as "surgical." However, Patient Record B shares enough relevant metadata attributes with correctly tagged Patient Record C. In that case, due to the similarity between Patient Record B and Patient Record C, Doctor A can see Patient Record B. The requisite similarity that is required may be user-defined and incorporated into the policy. This may be particularly useful where it is known that benign errors, such as the example just described, are likely to occur.

Yet another use case concerns quick update of a data access policy to support new sensitive keywords. To illustrate, should an organization that is only supporting "pii" data decide to start supporting "pci" data as well, a policy may be quickly defined at the security service provider that determines access to "pci" data. When "pci" is sent within the contextual metadata that is sent with the access request, access may be determined based on the new policy.

A final example use case relates to the provision of notifications about access decisions. For example, a security policy built using the context-based hierarchy could have attributes that indicate that notifications should be sent to a set of recipients, who may also constitute attributes in the hierarchy. For instance, attributes may be set in the context-based hierarchy to indicate that any "deny" action should automatically cause a notification to be sent to the data owner. Should a user attempt to access the data and a "deny" action be determined, the request metadata may be forwarded to the data owner for awareness. This would provide the data owner or data administrator full view of who is attempting to accessing what data, when, and provide insights that may help determine why the request was made. This feedback may be helpful in ongoing management of security policy and identification of threats.

G. Further Example Embodiments

Following are some further example embodiments of the invention. These are presented only by way of example and are not intended to limit the scope of the invention in any way.

Embodiment 1. A method, comprising: extracting content metadata from data; storing the content metadata in, or in a location accessible to, a data catalogue; receiving at the data catalogue, from a user, a request to access the data; transmitting, by the data catalogue to a security service provider, an access request that includes the extracted content metadata and metadata relating to the access request; accessing, by the security service provider, identity metadata concerning an identity of the user, and a data access policy; and transmitting, by the security service provider to the data catalogue, a decision as to whether or not access can be granted to the data, and the decision is based on the data access policy, the identity metadata, and the metadata in the access request.

Embodiment 2. The method as recited in embodiment 1, wherein the identity metadata is received by the security service provider from an identity server.

Embodiment 3. The method as recited in any of embodiments 1-2, wherein the data access policy is automatically modified, without manual intervention by a human, in response to a change to the data.

Embodiment 4. The method as recited in any of embodiments 1-3, wherein the extracted content metadata comprises metadata about one or more attributes of the data.

Embodiment 5. The method as recited in any of embodiments 1-4, wherein the data access policy defines a hierarchy of multiple metadata attributes.

Embodiment 6. The method as recited in any of embodiments 1-5, wherein the data access policy is enforceable with respect to the data regardless of the physical location of the data.

Embodiment 7. The method as recited in any of embodiments 1-6, wherein the data access policy is enforceable with respect to the data regardless of the entity that generated the data, how the data was generated, or when the data was generated.

Embodiment 8. The method as recited in any of embodiments 1-7, wherein the data access policy is immediately and automatically applied to newly added data.

Embodiment 9. The method as recited in any of embodiments 1-8, wherein an alert is automatically generated when data is detected that is not covered by the data access policy.

Embodiment 10. The method as recited in any of embodiments 1-9, wherein the data access policy defines a timeframe, or amount of time, that the user is permitted to access the data.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
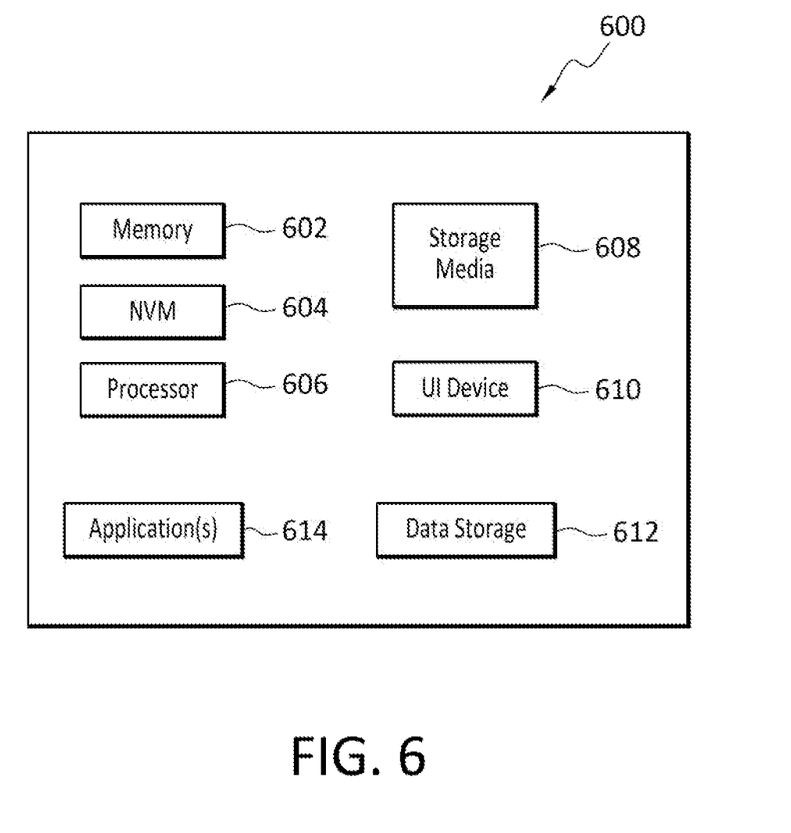
FIG. 6 discloses an example computing entity operable to perform any of the disclosed methods and processes.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    extracting content metadata from data;
    storing the content metadata in, or in a location accessible to, a data catalogue;
    receiving at the data catalogue, from a user, a request to access the data;
    transmitting, by the data catalogue to a security service provider, an access request that includes the extracted content metadata and metadata relating to the access request;
    accessing, by the security service provider, identity metadata concerning an identity of the user, and a data access policy; and
    transmitting, by the security service provider to the data catalogue, a decision as to whether or not access can be granted to the data, and the decision is based on the data access policy, the identity metadata, and the metadata in the access request.

2. The method as recited in claim 1, wherein the identity metadata is received by the security service provider from an identity server.

3. The method as recited in claim 1, wherein the data access policy is automatically modified, without manual intervention by a human, in response to a change to the data.

4. The method as recited in claim 1, wherein the extracted content metadata comprises metadata about one or more attributes of the data.

5. The method as recited in claim 1, wherein the data access policy defines a hierarchy of multiple metadata attributes.

6. The method as recited in claim 1, wherein the data access policy is enforceable with respect to the data regardless of the physical location of the data.

7. The method as recited in claim 1, wherein the data access policy is enforceable with respect to the data regardless of the entity that generated the data, how the data was generated, or when the data was generated.

8. The method as recited in claim 1, wherein the data access policy is immediately and automatically applied to newly added data.

9. The method as recited in claim 1, wherein an alert is automatically generated when data is detected that is not covered by the data access policy.

10. The method as recited in claim 1, wherein the data access policy defines a timeframe, or amount of time, that the user is permitted to access the data.

11. A non-transitory computer readable storage medium having stored therein instructions that are executable by one or more hardware processors to perform operations comprising:
- extracting content metadata from data;
- storing the content metadata in, or in a location accessible to, a data catalogue;
- receiving at the data catalogue, from a user, a request to access the data;
- transmitting, by the data catalogue to a security service provider, an access request that includes the extracted content metadata and metadata relating to the access request;
- accessing, by the security service provider, identity metadata concerning an identity of the user, and a data access policy; and
- transmitting, by the security service provider to the data catalogue, a decision as to whether or not access can be granted to the data, and the decision is based on the data access policy, the identity metadata, and the metadata in the access request.

12. The non-transitory computer readable storage medium as recited in claim 11, wherein the identity metadata is received by the security service provider from an identity server.

13. The non-transitory computer readable storage medium as recited in claim 11, wherein the data access policy is automatically modified, without manual intervention by a human, in response to a change to the data.

14. The non-transitory computer readable storage medium as recited in claim 11, wherein the extracted content metadata comprises metadata about one or more attributes of the data.

15. The non-transitory computer readable storage medium as recited in claim 11, wherein the data access policy defines a hierarchy of multiple metadata attributes.

16. The non-transitory computer readable storage medium as recited in claim 11, wherein the data access policy is enforceable with respect to the data regardless of the physical location of the data.

17. The non-transitory computer readable storage medium as recited in claim 11, wherein the data access policy is enforceable with respect to the data regardless of the entity that generated the data, how the data was generated, or when the data was generated.

18. The non-transitory computer readable storage medium as recited in claim 11, wherein the data access policy is immediately and automatically applied to newly added data.

19. The non-transitory computer readable storage medium as recited in claim 11, wherein an alert is automatically generated when data is detected that is not covered by the data access policy.

20. The non-transitory computer readable storage medium as recited in claim 11, wherein the data access policy defines a timeframe, or amount of time, that the user is permitted to access the data.

* * * * *